United States Patent
Sobhani et al.

(10) Patent No.: US 11,522,978 B2
(45) Date of Patent: Dec. 6, 2022

(54) METHODS, SYSTEMS, AND MEDIA FOR NETWORK MODEL CHECKING USING ENTROPY BASED BDD COMPRESSION

(71) Applicants: Ashkan Sobhani, Kanata (CA); Xingjun Chu, Ottawa (CA); Mohammed El Azzab, Ottawa (CA); Salaheddine Hamadi, Ottawa (CA)

(72) Inventors: Ashkan Sobhani, Kanata (CA); Xingjun Chu, Ottawa (CA); Mohammed El Azzab, Ottawa (CA); Salaheddine Hamadi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 96 days.

(21) Appl. No.: 17/008,269

(22) Filed: Aug. 31, 2020

(65) Prior Publication Data
US 2022/0070282 A1   Mar. 3, 2022

(51) Int. Cl.
H04L 29/06    (2006.01)
H04L 69/04    (2022.01)
H04L 41/12    (2022.01)
H04L 41/0866  (2022.01)

(52) U.S. Cl.
CPC .......... *H04L 69/04* (2013.01); *H04L 41/0866* (2013.01); *H04L 41/12* (2013.01)

(58) Field of Classification Search
CPC ...... H04L 69/04; H04L 41/0866; H04L 41/12
See application file for complete search history.

(56) References Cited

U.S. PATENT DOCUMENTS

2005/0234920 A1*  10/2005  Rhodes ............... H04L 43/026
2006/0075399 A1*   4/2006  Loh ...................... G06F 9/50
                                                          717/174

(Continued)

FOREIGN PATENT DOCUMENTS

CN    107515824 A    12/2017
CN    108521344 A     9/2018
WO   2013074115 A1    5/2013

OTHER PUBLICATIONS

J. Jain, J. Bitner, D. Moundanos, J. A. Abraham and D. S. Fussell, "A new scheme to compute variable orders for binary decision diagrams," Proceedings of 4th Great Lakes Symposium on VLSI, Notre Dame, IN, USA, 1994, pp. 105-108, doi: 10.1109/GLSV. 1994.289986.

(Continued)

*Primary Examiner* — Shean Tokuta
*Assistant Examiner* — Juan C Turriate Gastulo

(57) ABSTRACT

Methods, systems and media for network model checking using entropy based binary decision diagram (BDD) compression are described. Two related compression techniques are described: bit level reduction to reduce the number of bits required for each network field according to its nature, and field level reduction to reduce the size of the BDD tree by finding a near-optimum ordering of the fields in the BDD space. These two techniques, separately or together, may alleviate the state explosion problem the limits application of BDD based model checking. The two techniques complement each other synergistically, particularly in the domain of computer network checking and verification.

20 Claims, 10 Drawing Sheets

(56) References Cited

U.S. PATENT DOCUMENTS

| | | | | |
|---|---|---|---|---|
| 2010/0256977 | A1* | 10/2010 | Yu | G06K 9/6277 704/E15.001 |
| 2013/0063288 | A1* | 3/2013 | Bley | H04L 69/04 341/87 |
| 2013/0223446 | A1* | 8/2013 | Ernstrom | H04L 47/2441 370/392 |
| 2016/0071017 | A1* | 3/2016 | Adjaoute | G06N 20/00 706/52 |
| 2020/0099597 | A1* | 3/2020 | Richardson | H04L 41/16 |
| 2020/0302318 | A1* | 9/2020 | Hetherington | G06N 5/025 |

OTHER PUBLICATIONS

Somenzi, Fabio. (2000). Binary Decision Diagrams.

Randal E. Bryant. 1992. Symbolic Boolean manipulation with ordered binary-decision diagrams. ACM Comput. Surv. 24, 3 (Sep. 1992), 293-318. DOI:https://doi.org/10.1145/136035.136043.

R. Rudell, "Dynamic variable ordering for ordered binary decision diagrams," Proceedings of 1993 International Conference on Computer Aided Design (ICCAD), Santa Clara, CA, USA, 1993, pp. 42-47, doi: 10.1109/ICCAD.1993.580029.

M. Fujita, H. Fujisawa and N. Kawato, "Evaluation and improvement of Boolean comparison method based on binary decision diagrams," [1988] IEEE International Conference on Computer-Aided Design (ICCAD-89) Digest of Technical Papers, Santa Clara, CA, USA, 1988, pp. 2-5, doi: 10.1109/ICCAD.1988.122450.

S. Malik, A. R. Wang, R. K. Brayton and A. Sangiovanni-Vincentelli, "Logic verification using binary decision diagrams in a logic synthesis environment," [1988] IEEE International Conference on Computer-Aided Design (ICCAD-89) Digest of Technical Papers, Santa Clara, CA, USA, 1988, pp. 6-9, doi: 10.1109/ICCAD.1988.122451.

M. Fujita, Y. Matsunaga and T. Kakuda, "On variable ordering of binary decision diagrams for the application of multi-level logic synthesis," Proceedings of the European Conference on Design Automation., Amsterdam, Nethedands, 1991, pp. 50-54, doi: 10.1109/EDAC.1991.206358.

N. Ishiura, H. Sawada and S. Yajima, "Minimization of binary decision diagrams based on exchanges of variables," 1991 IEEE International Conference on Computer-Aided Design Digest of Technical Papers, Santa Clara, CA, USA, 1991, pp. 472-475, doi: 10.1109/ICCAD.1991.185307.

Hei Xinhong et al. "An Improved Ordering Method of Basic Eventsin Fault Tree Analysis", Computer Knowledge and Technology ,Aug. 31, 2017(Aug. 31, 2017) No. 24 vol. 13 ISSN:1009-3044,total:7pages.

* cited by examiner

METHODS, SYSTEMS, AND MEDIA FOR NETWORK MODEL CHECKING USING ENTROPY BASED BDD COMPRESSION

RELATED APPLICATIONS

This is the first patent application related to this matter.

FIELD

The present disclosure is related to methods, systems and media for network model checking, and in particular to methods, systems and media for network model checking using entropy based binary decision diagram compression.

BACKGROUND

Model checking, also called property checking, is a method for checking whether a finite-state model of a system (such as a network, e.g., a computer network) meets a given specification. A system that meets the specification is said to be correct, or to satisfy a correctness condition. Model checking is commonly used with hardware- and/or software-based computing and/or communication systems, wherein the specification may contain liveness requirements (such as avoidance of livelock) and/or safety requirements (such as avoidance of states representing a system crash). In the context of networks, such as computer networks, model checking may be referred to as network model checking. Model checking may also be referred to as verification or formal verification.

Binary Decision Diagrams (BDDs), also called branching programs, are data structures used to represent Boolean functions. BDDs have conventionally been used to model switching circuits. However, since their introduction in the domain of switching circuit modeling, different versions of BDDs have been employed in various other domains, including model checking. A BDD can be represented as a binary decision tree consisting of a top node, below which are one or more binary decision sub-trees that recursively follow the same pattern. A BDD can be used to model decisions made by network entities with regard to specific communications made via the network. For example, a digital data packet sent over network may include one or more fields (e.g., an internet protocol (IP) address, a port number, and a media access control (MAC) address) that are used by devices in the network to decide how that packet should be treated (e.g., forwarded to a specific other device, refused, granted access). A device may make these decisions using one or more network entities (e.g. access control lists (ACL), MAC address tables, network address translation (NAT) tables) hosted on the device or elsewhere on the network. The set of network entities of the network may thus be represented as a function applied to the field values in a packet to determine a final output of the network (e.g., a final disposition or destination of the packet). This function may be modeled by a BDD.

FIG. 1 (prior art) shows a simple example BDD 100. The BDD 100 has a top node 112 (also referred to as a root node), below which are a second node 114 and third node 116. The top node 112 represents a first variable $x_1$ 102 corresponding to a single bit value. The second node 114 and third node 116 both correspond to a second variable $x_2$ 104, also corresponding to a single bit value. Below the second node 114 and third node 116 are a third layer of further nodes 118 through 120 corresponding to a third variable $x_3$ 106, also corresponding to a single bit value. The BDD 100 can be considered to be a binary tree made up of the top node 112 and two binary sub-trees below it, one of which has the second node 114 as the top node of the sub-tree and the other of which has the third node 116 as the top node of the sub-tree. This analysis can be recursively extended down to each subsequent layer of the binary tree, with each subsequent node being regarded as the top node of its respective sub-tree.

Each sub-tree below a top node corresponds to a set of outputs based on a bit value of the top node. In the figure, the dashed lines connecting nodes correspond to "0" bit values and the solid lines connecting nodes correspond to "1" bit values. Thus, for example, if the bit value of the first variable $x_1$ 102 is "1", then the sub-tree with the second node 114 as its top node is traversed to determine the values of the second variable $x_2$ 104 and third variable $x_3$ 106, thereby yielding a bit vector $[x_1\ x_2 x_3]$ wherein $x_1=1$, thus $[1\ x_2 x_3]$. Similarly, if the bit value of the first variable $x_1$ 102 is "0", then the sub-tree with the third node 116 as its top node is traversed to determine the values of the second variable $x_2$ 104 and third variable $x_3$ 106, thereby yielding a bit vector $[x_1\ x_2 x_3]$ wherein $x_1=0$, thus $[0 x_2\ x_3]$.

By traversing the nodes of the BDD 100 downward along a given path, an output value 108 will be produced as a function of the bit vector $[x_1 x_2 x_3]$. Thus, for example, the bit vector [1 1 1] yields output value "1" at first output 122. The bit vector [1 1 0] yields output value "0" at second output 124. The bit vector [0 0 1] yields output value "1" at seventh output 126. Each output value 108 is dictated by a function taking the bit vector as its input, the function being represented by the BDD.

A potentially limiting factor of using BDDs is the amount of storage required. It will be appreciated that the simplified example BBD 100 shown in FIG. 1 represents only three variables, whereas many systems being modeled may involve hundreds of variables or more. As the number of BDD variables used to model the system increases, the size of the system representation in memory or storage grows exponentially. This problem is called the state explosion problem. Furthermore, in general, the order of variables used to represent the system heavily influences the size of the BDD. Therefore, the optimal ordering of BDD variables is defined as an ordering that yields the smallest BDD size.

Conventional approaches to network modeling using BDDs have no way to precisely determine the optimal ordering of BDD variables in an acceptable time period except for exhaustively checking all permutations of variable ordering. Assume n BDD variables, the number of variable orderings is n! (i.e. n factorial), such that finding the optimal variable ordering to minimize BDD size is a computationally hard (NP-hard) problem.

However, some heuristic approaches have been used which try to exploit characteristics of a domain-specific application or function to identify favorable BDD variable orderings. In general, these ordering approaches are classified into two main categories: static variable ordering and dynamic variable ordering. In static variable ordering, the order of BDD variables is specified based on predetermined criteria before creating the BDD space, and during the BDD operations (e.g., conjunction, disjunction, and negation) the ordering remains fixed (i.e. static). In dynamic ordering, first the BDD space is constructed with an initial ordering, and then during the BDD operations the ordering is changed to reduce the size of BDD if and when the size of BDD exceeds a threshold.

Static variable ordering approaches include breadth-first search (BFS), depth-first search (DFS), interleaving variables, correlation based approaches, and entropy based ordering. BFS performs a breadth-first search of a logic (e.g., a Boolean function such as a BDD modeling a network) from the input towards the output. DFS performs a depth-first search of a logic from the output towards the inputs. Interleaving variables may be used when the states of a system are represented by vector variables: e.g., if the state is represented by X and Y (X=x0x1, Y=y0y1), the state can be represented by the interleaving of X and Y variables, i.e. x0y0x1y1. Correlation based approaches are generally used such that correlated variables are kept close together within the BDD. In entropy based ordering, the entropy of each variable is computed, and then the variables are ordered in ascending order (from low to high). Each of these static ordering approaches generally operates at the bit level: i.e. each variable corresponds to a single bit value, and each variable is ordered independently.

Dynamic variable ordering approaches include interchanging of two adjacent variables, window permutation, and sifting. Interchanging of two adjacent variables typically involves examining all variable orderings using only the operation of adjacent variable interchange, which is typically not practical in terms of the time required. Window permutation typically involves variable reordering within a window of multiple variables. Sifting typically involves randomly choosing pairs of variables and swapping the positions of the pairs within the ordering. Each of these dynamic ordering approaches also generally operates at the bit level.

Thus, there is a need for a BDD compression technique for network modeling which overcomes one or more of the above-noted disadvantages of existing techniques and/or provides favorable compression performance in a reasonably small amount of computation time.

SUMMARY

In various embodiments described herein, methods, systems and media are disclosed that provide network model checking using entropy based binary decision diagram compression. Various embodiments may include one or both of two related compression techniques: bit level reduction to reduce the number of bits required for each network field according to its nature (e.g., range, IP prefix), and field level reduction to reduce the size of the BDD tree (i.e. the number of nodes required by the BDD sub-tree) by finding a near-optimum ordering of the fields in the BDD space. Separately or jointly, these two techniques may alleviate the main limitation of using BDDs for formal network verification: namely, the requirement of large amounts of memory (i.e. the state explosion problem described above). The amount of memory required for building a BDD model representing the behavior of a network may thus be reduced.

In various embodiments, a static ordering method may be used to order the network fields in the BDD space according to a calculated field level entropy of each field to minimize node count used in the BDD shared table, and thereby to minimize the memory usage. Field level entropy presents the real number of bits required to encode the values of a field regardless of the number of bits used in a packet header on a network.

It should be highlighted that the static ordering method of BDD variables in the present disclosure is different from the existing approaches described above insofar as the presently described embodiments operate at the bit-vector level as opposed to the bit level as in the existing approaches. Whereas the presently described embodiments perform ordering based on field entropy, this is different from existing entropy based ordering approaches that order variables based on variable entropy. Existing entropy based ordering approaches order variables (i.e., individual bit values at individual nodes of the BDD) according to the ascending order of conditional entropies of the intended Boolean function with respect to each variable such that a root node (or top-level node) of the BDD tree is selected based on having the highest entropy value, i.e. the highest information value or highest ambiguity reduction value. In contrast, the presently described embodiments may order multi-node sub-trees of the BDD tree based on a calculated field entropy, such that an entire multi-node sub-tree corresponding to the highest-entropy field is located at the top or root of the BDD, with subsequent sub-trees corresponding to lower-entropy fields positioned below the top sub-tree. Thus, whereas existing approaches may be said to operate at the bit level (i.e. ordering of individual variables), the examples described herein may be said to operate at the bit-vector level (i.e. ordering of multi-bit sub-trees).

By calculating the entropy of entire fields across the entire network rather than the entropy of individual variables, the variables of a field can be kept together in a single sub-tree while ordering the sub-trees of the BDD by the calculated field entropy. Because the entropy of a field generally corresponds to the number of bits (i.e. variables) needed to model it, this means that the largest sub-tree (corresponding to the field having the highest entropy) only appears once in the BDD, at the top, whereas smaller sub-trees having a smaller number of variables (and corresponding to lower-entropy fields) may be repeated many times lower in the BDD. This may dramatically reduce the size of the BDD and the associated memory, storage, and computation requirements. The full utility of the presently described approach will be appreciated based on the detailed description of example embodiments below.

Bit-level reduction of BDD size may effect further compression in addition to the entropy-based field ordering described above. Network fields having continuous ranges of values may be represented by binary representations that efficiently encode ranges and sub-ranges, called basic intervals, using techniques described herein. These binary representations of continuous ranges can then be treated like discrete values in calculating field entropy for the purpose of entropy-based sub-tree ordering. The bit-level reduction techniques described herein are therefore complimentary to the BDD field ordering techniques described herein.

Furthermore, examples described herein may apply domain-specific knowledge to optimize the compression of BDDs used for modeling computer networks. Little to no existing work in the field of BDD compression attempts to apply network knowledge to optimize BDD performance in terms of memory consumption. The methods described herein for generating binary representations of continuous ranges for the values of network fields may exhibit particular advantages when applied to the domain of computer network modeling, due to the common occurrence of continuous ranges of field values, such as IP address ranges and port number ranges, used by computer networks in various network entities such as access control lists, MAC address lists, NAT tables, and other network entities.

This disclosure thus provides methods, systems, and processor-readable media to minimize the required number of bits for different types of network fields, as well as an effective ordering approach to minimize the memory required for building BDD models. These techniques may allow BDDs to be applied to encoding or modeling the behavior of large network without running into the memory limitations described above.

In addition to reduction in BDD size, experimental results testing these techniques show that the time required to build BDDs can be reduced significantly relative to conventional approaches. The amount of preprocessing time required by the techniques described herein may be significantly shorter than the time required for finding the best order using existing approaches, i.e. the NP-hard problem described above. Thus, the examples described herein may represent a significant overall savings in computation time for BDD-based network modeling relative to existing approaches.

As used herein, the term "computer network" refers to a set of computing devices or electronic communication devices in communication with one another using one or more standardized digital communication protocols. The communications may take place over any type of wired or wireless digital communication link, or combinations thereof. The devices may be routers, switches, computers such as servers or personal computers, mobile devices such as smartphones, Internet of Things (IoT) devices, Internet of Vehicles (IoV) devices, satellite communication devices, or any other devices capable of transmitting, receiving, and/or routing communications via a digital communication network. Whereas example embodiments are described herein with reference to computer networks, it will be appreciated that the methods, systems, and media described herein are applicable to systems other than computer networks wherein a model of the system needs BDD vector variables to show systems states. Furthermore, the encoding techniques for continuous ranges of values of network fields may be applicable to any domain in which some fields of a model have continuous ranges of values.

As used herein, the term "network entity" refers to a data structure or set of rules applied by a device in a computer network to determine how a communication in the network is treated, on the basis of the values of various data fields (also called simply "fields") present in the communication. A network entity may therefore be a table that may be used to determine whether the values of the fields of a communication (such as a digital data packet) satisfy various criteria, and to thereby determine how the communication is to be treated (e.g., forwarded to a specific device or port, translated, accepted, rejected). Network entities may include access control lists (ACL), MAC address tables, IP address tables, NAT tables, and so on. It will be appreciated that any set of rules used by switches, routers, or other network devices to determine treatment of a data packet, and therefore may affect how a network treats a given communication, may potentially be regarded as a network entity.

As used herein, a "field" refers to a data field. A communication (such as a data packet) may specify values for one or more fields, and network entities may specify one or more values or ranges of values for the field as part of a rule determining treatment of the communication. Examples of common fields used in computer networks include IP address, MAC address, and port number.

As used herein, "variable" refers to a node within a BDD. Each node within a BDD corresponds to a single bit (i.e. a binary value) encoding information about the behavior of a network or other system being modeled. A field in a network may be modeled using one or more variables to disambiguate among the possible values of the field. When these variables are grouped together sequentially, they may be referred to as a "bit vector" representing the possible values of the field.

As used herein, "entropy" refers to the common definition of the term as used in information theory, i.e. the average level of information, surprise, or uncertainty inherent in the possible outcomes of a field or a variable. Entropy may be calculated for a single bit of a field (i.e. a single variable), or for an entire bit vector representing a field. Typically, the more bits a field requires to represent its possible values, the higher the entropy of the field. This concept may also be referred to as "Shannon entropy" to further disambiguate from other ways in which the term "entropy" may be used.

As used herein, the term "Gray code", also called a reflected binary code (RBC), shall have its common meaning in the field of computer science, i.e. an ordering of a binary numeral system such that two successive values differ in only one bit.

In some aspects, the present disclosure describes a method for generating a binary decision diagram (BDD) for checking a computer network model. The method comprising identifying one or more network entities of the computer network model, and identifying a plurality of fields of the computer network model. For each field, a plurality of values for the field are identified as the union of the values for the field specified by each network entity. An entropy value is calculated for each field based on the plurality of values for the field, and a plurality of variables of the BDD are ordered based on the entropy values of the fields corresponding to the variables.

In some aspects, the present disclosure describes a system. The system comprises one or more processor devices, and a memory storing instructions. When executed by the one or more processor devices, the instructions cause the system to generate a binary decision diagram (BDD) for checking a computer network model by identifying one or more network entities of a computer network model; identifying a plurality of fields of the computer network model; for each field, identifying a plurality of values for the field as the union of the values for the field specified by each network entity; calculating an entropy value for each field based on the plurality of values for the field; and ordering a plurality of variables of the BDD based on the entropy values of the fields corresponding to the variables.

In some examples, ordering the plurality of variables comprises populating a top sub-tree of a BDD tree with a first plurality of variables corresponding to a first field having a highest entropy value of the fields of the computer network model, and populating one or more subsequent BDD sub-trees below the top sub-tree by recursively repeating a step of populating a top sub-tree of each subsequent BDD sub-tree with a subsequent plurality of variables corresponding to a subsequent field having a highest entropy value of the fields of the subsequent BDD sub-tree.

In some examples, the method further comprises categorizing at least one field of the plurality of fields as a continuous field characterized by values spanning at least one continuous range, and, for each field categorized as a continuous field, performing the steps of identifying one or more continuous ranges for the values of the field, generating a binary representation of each continuous range, and calculating the entropy of the field based on the binary representations of the continuous ranges for the values of the field.

In some examples, the entropy value of a field categorized as a continuous field is based on each of the binary representations of the continuous ranges of the field's value, a frequency of usage of each of the continuous ranges of the field's value, and a frequency of usage of each other value of the field.

In some examples, the entropy value of a field not categorized as a continuous field is based on a frequency of usage of each value of the field.

In some examples, the frequency of usage of a value of a field is based on how many network entities of the computer network model specify the value for the field, and the frequency of usage of a continuous range of values of a field is based on how many network entities of the computer network model specify the continuous range of values for the field.

In some examples, identifying one or more continuous ranges for the values of a continuous field and generating a binary representation of each continuous range comprises number of steps. One or more continuous ranges for the values of the continuous field are identified, each continuous range being defined by two boundary values such that the boundary values for each continuous range of the continuous field collectively define a set of boundary values of the continuous field. A plurality of basic intervals are identified such that each continuous range can be defined as a union of one or more basic intervals, and each basic interval is defined by two boundary values selected from the set of boundary values. A binary representation of each basic interval is generated, and a binary representation of each continuous range is generated based on the binary representations of the one or more basic intervals defining the continuous range.

In some examples, the binary representations of the plurality of basic intervals of a continuous field comprise a Gray code.

In some examples, the entropy value calculated for each field is a Shannon entropy value. The entropy value of a field categorized as a continuous field is based on each of the binary representations of the continuous ranges of the field's value, a frequency of usage of each of the continuous ranges of the field's value, and a frequency of usage of each other value of the field. The entropy value of a field not categorized as a continuous field is based on a frequency of usage of each value of the field. The frequency of usage of a value of a field is based on how many network entities of the computer network model specify the value for the field. The frequency of usage of a continuous range of values of a field is based on how many network entities of the computer network model specify the continuous range of values for the field.

In some aspects, the present disclosure describes a computer-readable medium having instructions tangibly stored thereon. The instructions, when executed by a processor device, cause the processor device to perform the method steps described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In examples disclosed herein, methods and apparatuses are described that provide network model checking using entropy based binary decision diagram compression.

The example embodiments described herein may refer to one or more "software modules". As used herein, the term "software module" may refer to any set of software or firmware instructions executable by a processor, controller, or other computing hardware to carry out the operations described herein.

Example Computing System

Figure 1:
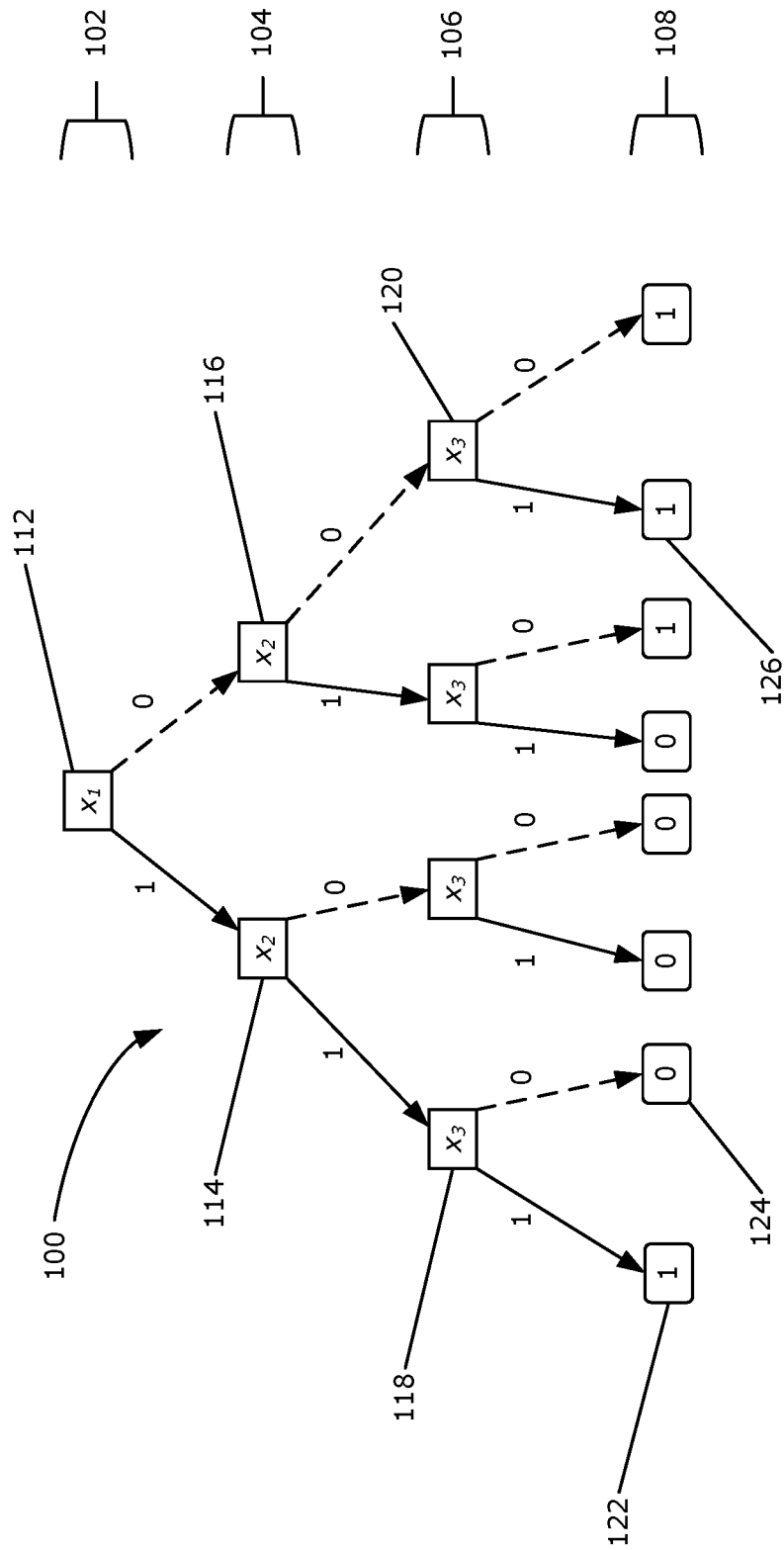
FIG. 1 (prior art) is a binary decision diagram (BDD).

To assist in understanding the present disclosure, FIG. 1 is first discussed.

Figure 2:
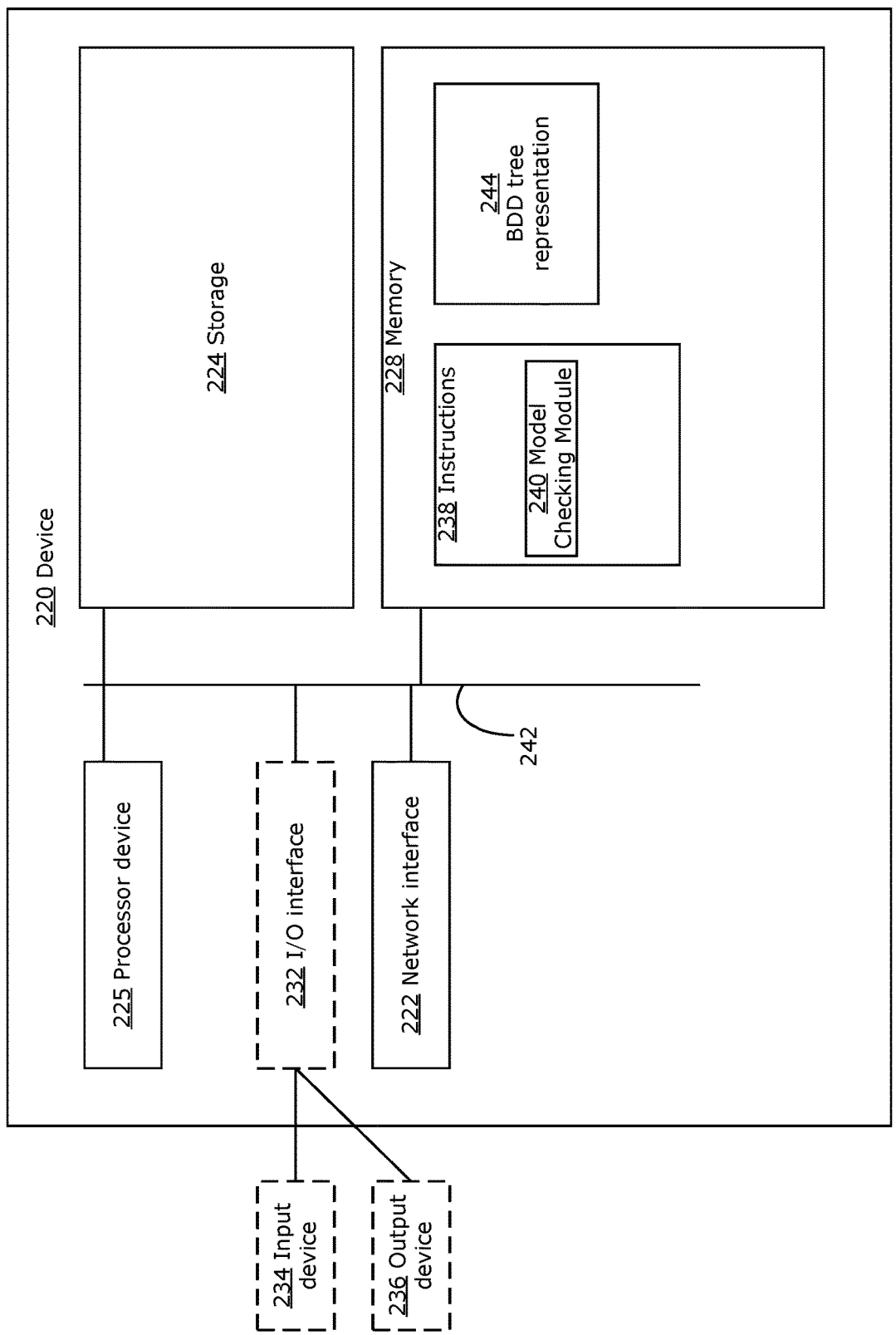
FIG. 2 is a block diagram illustrating a simplified example of a computing system suitable for carrying out examples described herein.

FIG. 2 is a block diagram illustrating a simplified example of a computing system 220, such as a computer or a cloud computing platform, suitable for carrying out examples described herein. Other examples suitable for implementing embodiments described in the present disclosure may be used, which may include components different from those discussed below. Although FIG. 2 shows a single instance of each component, there may be multiple instances of each component in the system 220.

The system 220 may include one or more processor devices 225, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The system 220 may also include one or more optional input/output (I/O) interfaces 232, which may enable interfacing with one or more optional input devices 234 and/or optional output devices 236.

In the example shown, the input device(s) 234 (e.g., a keyboard, a mouse, a microphone, a touchscreen, and/or a keypad) and output device(s) 236 (e.g., a display, a speaker and/or a printer) are shown as optional and external to the system 220. In other examples, there may not be any input device(s) 234 and output device(s) 236, in which case the I/O interface(s) 232 may not be needed.

The system 220 may include one or more network interfaces 222 for wired or wireless communication with one or more devices or systems of a network, such as a network being modeled by the methods described herein. The network interface(s) 222 may include wired links (e.g., Ethernet cable) and/or wireless links (e.g., one or more antennas) for intra-network and/or inter-network communications.

The system 220 may also include one or more storage units 224, which may include a mass storage unit such as a solid state drive, a hard disk drive, a magnetic disk drive and/or an optical disk drive.

The system 220 may include one or more memories 228, which may include a volatile or non-volatile memory (e.g., a flash memory, a random access memory (RAM), and/or a read-only memory (ROM)). The non-transitory memory(ies) 228 may store instructions for execution by the processor device(s) 225, such as to carry out examples described in the present disclosure. The memory(ies) 228 may include other software instructions 238, such as for implementing an operating system and other applications/functions. In some examples, the memory(ies) 228 may include software instructions 238 for execution by the processor device 225 to implement a model checking module 240, as described further below. The model checking module 240 may be loaded into the memory(ies) 228 by executing the instructions 238 using the processor device 225.

The non-transitory memory(ies) 228 may also store a representation of a BDD tree, such as BDD 100, as a BDD tree representation 244. It will be appreciated that the size of the BDD tree representation 244 stored in memory 228 may be a limiting factor in the use of BDDs for network model checking for the reasons described above. Some of the embodiments described herein may effectively compress the size of the BDD tree representation 244 such that it takes up less space in memory 228 than conventional BDD representations.

In some examples, the system 220 may additionally or alternatively execute instructions from an external memory (e.g., an external drive in wired or wireless communication with the system 220) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The system 220 may also include a bus 242 providing communication among components of the system 220, including those components discussed above. The bus 242 may be any suitable bus architecture including, for example, a memory bus, a peripheral bus or a video bus.

It will be appreciated that various components and operations described herein can be implemented on multiple separate devices or systems in some embodiments.

Example Network

Figure 3:
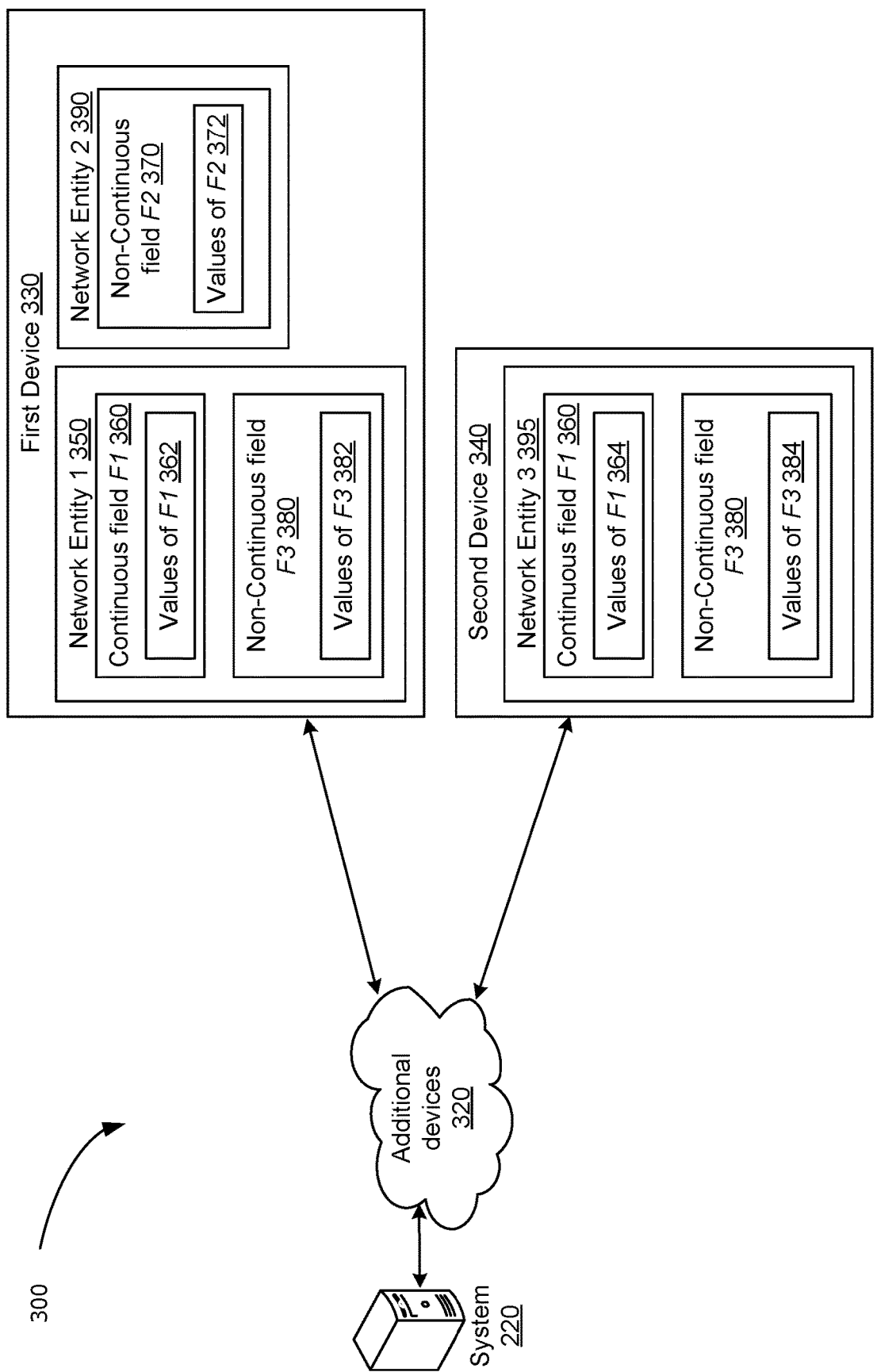
FIG. 3 is a schematic diagram of an example network 300, showing an example operating environment for examples described herein.

FIG. 3 is a schematic diagram of an example network 300, showing an example operating environment for examples described herein. The network 300 is a computer network as described above. It includes multiple devices in communication using one or more digital communication protocols via some combination of wired and wireless communication links. The devices on the network 300 in this example include the system 220 of FIG. 2, a first network-enabled device ("device 1") 330, a second network-enabled device ("device 2") 340, and optionally one or more additional devices 320. The various devices 330, 340, 320 may be switches, routers, or any other network-enabled device as described above, such as a desktop computer, server, or handheld electronic device. Typically, the behavior of a computer network is modeled on the basis of devices used for managing network traffic, such as routers, switches, servers, firewalls, and so on.

The first device 330 includes two network entities, as that term is defined above. Network entity 1 350 and network entity 2 390 may be tables or sets of rules for managing network communications that are used by the first device 330 to manage packets or other communications on the network 300. For example, network entity 1 350 may be an access control list (ACL) providing a list of permissions for accessing a resource of the first device 330, and network entity 2 390 may be a routing table that is used to route incoming packets based on a port number specified by the packet.

Network entity 1 350 includes two fields: continuous field F1 360 and non-continuous field F3 380. These may be data fields of received communications, such as digital data packets, that determine how the communications will be handled by network entity 1 350. For example, continuous field F1 360 may be an internet protocol (IP) address, and non-continuous field F3 380 may be a media access control (MAC) address. Network entity 1 350 may be an ACL determining access to certain network resources based on a set of rules, each rule being based on the IP address (continuous field F1 360) and MAC address (non-continuous field F3 380) of packets received by the first device 330. The rules defined by network entity 1 350 may specify a set of values for the IP address (continuous field F1 360), shown as the set of values of F1 362, and a set of values for the MAC address (non-continuous field F3 380), shown as the set of values of F3 382.

Similarly, non-continuous field F2 370 may be a protocol field. Network entity 2 390 may be a routing table that routes received packets to a given IP address and/or port number on the basis of a set of rules that each specify a set of values for the protocol being used (non-continuous field F2 370), shown as a set of values of F2 372.

The second device 340 includes one network entity, network entity 3 395, which may be, for example, a dynamic host configuration protocol (DHCP) table providing a list of IP addresses assigned to a device on the network 300 having a particular MAC address. Thus, network entity 3 395 includes the same two fields as network entity 1 350, namely continuous field F1 360 (IP address in this example), and non-continuous field F3 380 (MAC address in this example). The rules dictating the behavior of the DHCP table (network entity 3 395) specify a set of values for continuous field F1 360, shown as values of F1 364, and a set of values for non-continuous field F3 380, shown as values of F3 382.

Thus, as between the two devices 330 and 340, the network 300 includes three network entities 350, 390, and 395, which collectively specify sets of values for the various fields (values 362 and 364 for field F1 360, values 372 for field F2 370, and values 382 and 384 for field F3 380) that affect the treatment by the network 300 of packets specifying those values for the various fields.

BDD Variable Ordering

Methods will now be described for reducing the size of a BDD (i.e., reducing the number of nodes required for the BDD) used for computer network modeling by finding an optimal or near-optimal ordering of the BDD variables at the level of network fields (as opposed to at the level of individual BDD variables). This approach may be referred to herein as "field level reduction".

Examples described herein may order the BDD variables based on a field entropy calculation, with sub-trees of the BDD corresponding to networks fields ordered from higher entropy to lower entropy. Theoretically, the entropy for each field may represent the number of bits used to encode or represent the field. Accordingly, it is expected that the BDD size (i.e. number of BDD bits or variables) of fields with higher entropy will be larger than the BDD size of fields with lower entropy, as the higher-entropy fields have more bits.

Moreover, a BDD model for a single network entity (i.e. a BDD sub-tree or set of BDD nodes corresponding to the rules applied by a network entity) may be constructed by combining the BDDs of constitutive fields used in the network entity's configuration (i.e. field values specified by its rules). For example, network entity 1 350 of FIG. 3 specifies a set of values 362 for field F1 360 and a set of values 382 for field F3 380, so a BDD model for the behavior of network entity 1 350 would combine BDD sub-trees modeling the interaction of the rules of network entity 1 350 with respect to F1 values 362 and F3 values 382. If the behavior of the entire network 300 with respect to field F1 360 is such that field F1 360 has a high entropy value, this means that a large number of network entity BDD models in the network 300 rely on at least some parts of the BDD sub-tree corresponding to field F1 360. This feature can be leveraged by placing fields with higher entropy at the top of the shared BDD tree, such that the F1 values 362 it could be shared among the replica of smaller sub-trees for fields with lower entropy, and as a result, the whole size of a network entity's BDD model can be reduced.

In order to effect an ordering of network fields in the BDD by field entropy, the entropy of each field as used across the network 300 must be calculated. This requires a set of steps that will now be described.

First, all device configurations are scanned to collect all values used for each field as well as their frequency of usage. For example, the model checking module 240 of system 220 may be executed by processor device 225 to scan all devices 320, 330, 340 on the network 300 using network interface 222 to determine the configuration of each network entity 350, 390, 395. This results in a representation of the various rules of each network entity, e.g., the specification by the rules of the various network entities of values 362, 364, 372, 382, and 384 for fields F1 360, F2 370, and F3 380. These rules or sets of values may be represented by system 220 in memory or storage, for example as a table or set of tables such as the example shown in Table 1 below:

TABLE 1

Example table of field values with respective frequencies of usage

| $f_1$ | | $f_2$ | | ... | | $f_k$ | |
|---|---|---|---|---|---|---|---|
| value | count | value | count | value | count | value | count |
| $V_{1,1}$ | $C_{1,1}$ | $V_{2,1}$ | $C_{2,1}$ | ... | ... | $V_{k,1}$ | $C_{k,1}$ |
| ... | ... | ... | ... | ... | ... | ... | ... |
| $V_{1,n1}$ | $C_{1,n1}$ | $V_{2,n2}$ | $C_{2,n2}$ | ... | ... | $V_{k,nk}$ | $C_{k,nk}$ |

In Table 1 above, $f_i$ identified field i, $v_{i,j}$ indicates a jth value of field i, and $c_{i,j}$ indicates the number of usages of the jth value of field i. The number of usages may indicate the number of times that value appears in a rule of a network entity of the network 300 in such a way that the use of that value potentially affects the output of the network. This count or number of usages may be referred to as a frequency of usage of a value of a field.

In some embodiments, some fields may be categorized by system 220 as fields having continuous ranges of values. In such embodiments, the values of the field may be represented by the system 220 as some combination of basic intervals for field values and individual field values, along with the frequency of usage of each basic interval and each individual value. Such examples are described in greater detail below with reference to FIGS. 6-12. In such embodiments, a "value" $v_{i,j}$ may indicate either a discrete value of the field or a "basic interval" for the value of the field, as described below with reference to FIGS. 6-12. Thus, the frequency of usage of a basic interval by network entities of the network may be treated identically to frequency of usage of individual values of a field for the purpose of calculating field entropy: $c_{i,j}$ for $v_{i,j}$ may indicate the frequency of usage of basic interval $v_{i,j}$.

Once the network entities have been assessed and represented by the system 220 as described above, entropy may be calculated for each field of the network 300. In the present example, a field $f_1$ as shown in Table 1 may be represented by Equation (1):

$$v_1 = \{v_{1,i} | 1 \leq i \leq n_1\} \quad (1)$$

as the set of values for the field $f_1$ in all configurations.

The empirical probability mass function $P(V_1)$ for field $f_1$ is calculated using Equation (2):

$$P(V_1) = \{p(v_{1,1}), \ldots, p(v_{1,n1})\} = \left\{ \frac{c_{1,1}}{\sum_{j=1}^{n1} c_{1,j}}, \ldots, \frac{c_{1,n1}}{\sum_{j=1}^{n1} c_{1,j}} \right\} \quad (2)$$

Accordingly, a normalized empirical entropy for field $f_1$ can be calculated using Equation (3):

$$H(V_1) = \frac{-\sum_{i=1}^{n1} p(v_{1,j}) \log(p(v_{1,j}))}{\log(2^l)} = \frac{-\sum_{i=1}^{n1} p(v_{1,j}) \log(p(v_{1,j}))}{l} \quad (3)$$

Equations (2) and (3) may then be repeated to calculate the normalized entropy for all fields of the network 300.

The calculated normalized field entropies may then be used to order the corresponding BDD variables when creating the BDD space. It will be appreciated, as described above, that the units being ordered are the vector variables encoding groups of bit-level BDD variables, each bit vector corresponding to a field, and each bit vector corresponding to a multi-node sub-tree of the BDD. This approach can be distinguished from existing approaches that order individual bit-level BDD variables.

Some embodiments may use the techniques described herein to design a network from the ground up rather than scanning and modeling an existing network. In some such embodiments, the configuration of each network entity may exist as a configuration stored locally by the system 220, and instead of scanning the devices of the network to determine the network entity configuration, the model checking module 240 may retrieve the configuration of the network entity from the memory 228.

Figure 4:
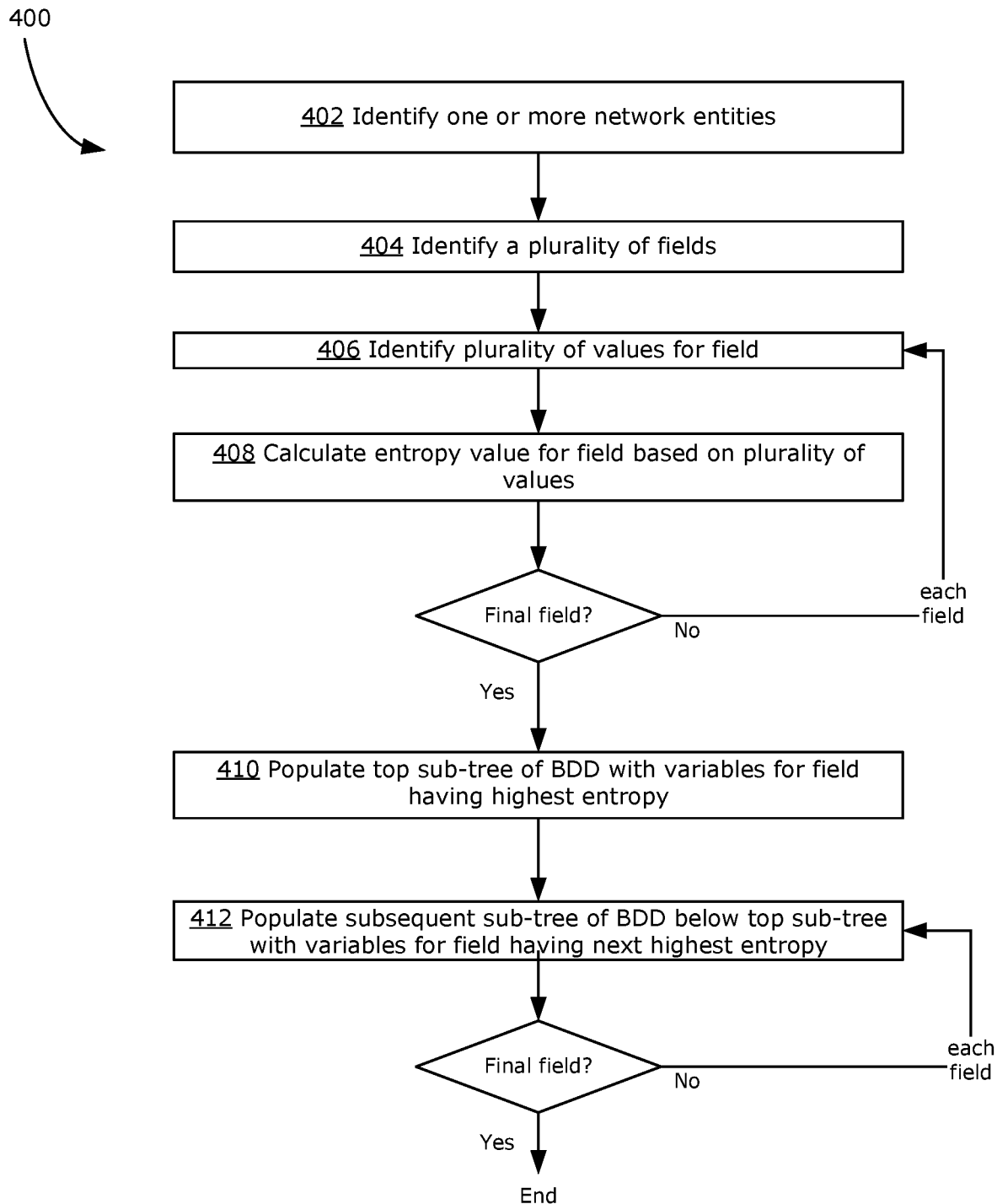
FIG. 4 is a flowchart illustrating the steps of an example method for generating a BDD for checking a computer network model, in accordance with examples described herein.

FIG. 4 is a flowchart illustrating the steps of an example method 400 for generating a BDD for checking a computer network model, in accordance with the steps and equations described above.

At 402, one or more network entities of the computer network model are identified. This may include, e.g., network entities 350, 390, and 395 of network 300 in FIG. 3. This step 402 may be performed by the system 220 scanning the devices 320, 330, 340 of the network 300 and identifying each network entity 350, 390, 395 of each device as described above.

At 404, a plurality of fields of the computer network model are identified. In the network 300 of FIG. 3, this may include fields 360, 370, and 380. This step 404 may be performed by the system 220 scanning the devices 320, 330, 340 of the network 300 and collecting configuration information for each network entity 350, 390, 395 as described above.

At 406, for each field, a plurality of values for the field are identified. This step 406 may be performed by the system 220 collecting configuration information for each network entity 350, 390, 395 as described above, including identifying the sets of values 362, 364, 372, 382, 384 for the various fields specified by the various network entities. The plurality of values for a given field is equal to the union of the values for the field specified by each network entity: thus, the plurality of values for field F1 360 is the union of values 362 and values 364, the plurality of values for field F2 370 is values 372, and the plurality of values for field F3 380 is the union of values 382 and values 384.

In some embodiments, for some fields, step 406 may further include the steps of method 1200 described below with reference to FIG. 12. Method 1200 specifies how fields having continuous ranges of values may be treated in order to compress their binary representations prior to entropy calculation.

At 408, an entropy value is calculated for each field based on the plurality of values for the field. In some embodiments, the entropy value calculated for each field is a Shannon entropy value. As described above, the entropy value of a field is based on a frequency of usage of each value of the field, or of each basic interval of values of the field for fields categorized as having continuous ranges of values.

Steps 406 and 408 are repeated for each field of the network 300 identified at step 404.

Once entropy has been calculated for each field of the network, a plurality of variables of the BDD may be ordered based on the entropy values of the fields corresponding to the variables at steps 410 and 412. These steps may be described with reference to FIG. 5.

Figure 5:
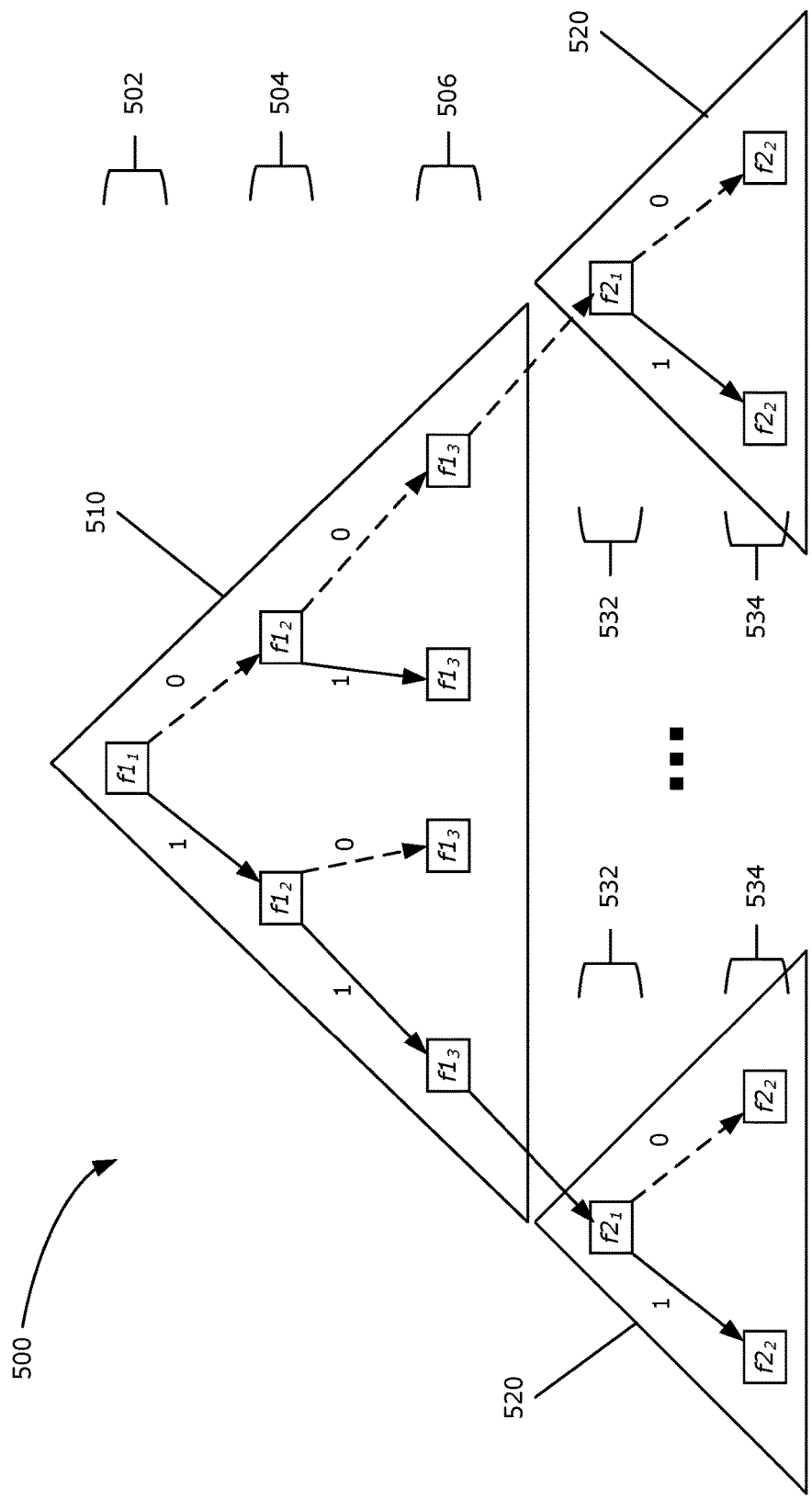
FIG. 5 is an example BDD, generated in accordance with examples described herein.

FIG. 5 is an example simplified BDD 500, generated in accordance with examples described herein, such as steps 410 and 412 of method 400. The BDD 500 includes a top sub-tree 510 and a subsequent sub-tree 520.

At 410, a top sub-tree 510 of a BDD tree 500 is populated with a first plurality of variables corresponding to a first field having a highest entropy value of the fields of the computer network model. Field f1 of FIG. 5 corresponds to three variables $f1_1$ 502, $f1_2$ 504, and $f1_3$ 506 and is used to populate top sub-tree 510 of the BDD 500.

At 412, one or more subsequent BDD sub-trees below the top sub-tree 510 are populated by recursively repeating a step of populating a top sub-tree of each subsequent BDD sub-tree with a subsequent plurality of variables corresponding to a subsequent field having a highest entropy value of the fields of the subsequent BDD sub-tree. For example, in FIG. 5, field f2 corresponds to two variables, $f2_1$ 532 and $f2_2$ 534, and is used to populate a first subsequent sub-tree 520 of the BDD 500. The use of a three-bit (i.e. three variable) bit vector to represent field f1 signifies that the calculated entropy of field f1 is greater than the calculated entropy of field f2, which only requires two bits.

In this example, field f1 is the highest-entropy field of the network, whereas field f2 is the field of the network having a next-highest entropy. It will be appreciated that, in most actual network models, the highest-entropy and second-highest-entropy fields would likely require many more than three or two bits for representation. This example is simplified for the sake of clarity. It will also be appreciated that the ellipses (" . . . ") in FIG. 5 denote any number of instances of first subsequent sub-tree 520 that may be necessary to model the paths extending downward from other nodes of the $f1_3$ layer 506 of the top sub-tree 510.

Step 412 repeats as many times as desired, for example until all fields of the network 300 have been modeled in the BDD 500. Each recursive repetition of step 412 may populate further subsequent sub-trees below each instance of first subsequent sub-tree 520.

It will be appreciated that this ordering of sub-trees may reduce the storage and computation required to represent and perform operations upon the BDD tree 500. For example, if smaller sub-tree 520 were used as the top sub-tree of the BDD 500, and larger sub-tree 510 were placed below sub-tree 520, the total size of the BDD 500 would be larger due to the larger number of bits of sub-tree 510 which would appear in multiple instances. Further advantages of field entropy-based ordering of sub-trees of the BDD are described above.

By using the field-level ordering based on field entropy, the amount of memory and the time required for building BDD models may both be reduced in some embodiments. In this way, the state explosion problem of BDD model checking may be addressed, potentially allowing larger networks to be formally verified using BDD-based network model checking. It will be appreciated that the field level entropy based ordering techniques described herein can be applied in domains other than computer networks, such as any domain in which the model of the system needs BDD vector variables to show the states of the system.

A fully-populated BDD tree 500 may be used to model and verify the network 300 in accordance with known techniques for network model checking, verification, and/or validation. Some embodiments may use the BDD tree 500 to assist in designing and/or re-designing networks. For example, some embodiments may scan an existing network configuration as described above to build the BDD 500 as described herein. If the model checking process reveals design flaws in the network 300, the model may be modified and re-checked. Once the model checking process is able to validate or verify a re-designed configuration for the network, that configuration may be pushed out or provisioned to the various network entities of the various devices of the network 300 using known techniques for network device administration and configuration. In some embodiments, as described above, the scanning step may be omitted altogether, and a network configuration may be designed from the ground up, e.g., locally on the system 220, before being validated and then provisioned to devices of the network 300. In any embodiments including a step of provisioning or configuring devices on the network, the configuration step may be accomplished through the network itself, through local configuration of individual devices (e.g. through direct user input or by loading configuration data using removable storage media), or through some combination thereof. The configuration step may be accomplished automatically in some embodiments using the model checking module 240 or another functional module implemented by the instructions 238 of the system 220, by sending configuration instructions to the various devices of the network 300 via the network interface 222. In other embodiments, the system 220 sends the configuration data corresponding to the verified model to a separate administration device on the network, which is then used to configure the other devices of the network 300.

As part of the method 400 for creating BDD trees ordered by field entropy, some embodiments may compress the bit representations of fields having continuous ranges specified for the field values. Such example embodiments will now be described with reference to FIGS. 6-12.

Fields Having Continuous Ranges of Values

In some embodiments, the number of required BDD variables can be reduced based on the types of fields used by network entities of the network. Some such embodiments may exhibit particular advantages in the domain of computer network model checking and verification due to the widespread use of continuous ranges for the values of various fields used in computer networks. For example, many rules implemented by network entities specify ranges of values for IP addresses, ports, and so on.

The types of fields specified by network entities and in packets sent through computer networks can be divided, for the purpose of this disclosure, into those having sporadic values (i.e. discrete values that do not fall into continuous ranges) and fields having continuous ranges of values (i.e. values that are either mathematically continuous or multiple discrete values that are at least sometimes adjacent). Fields having continuous ranges of values may also have one or more sporadic values. Thus, for example, a first field may be a universal MAC address (as distinct from a locally administered MAC address used in virtualization), which has only sporadic values, i.e. each universal MAC address value specified by a packet or a network entity is unlikely to be adjacent to or continuous with any other universal MAC address specified by a packet or network entity. A first universal MAC address may be "A3-06-5E-23-B7-4C", whereas a second universal MAC address may be "98-30-CD-D7-8A-22". Network entities specifying universal MAC address values will almost always specify individual unique MAC addresses corresponding to known devices on the network. By contrast, an IP address administered locally (e.g. by a local DHCP server on the network) may very well be adjacent to other IP addresses administered by the same DHCP server, such that a large number of devices on the network have IP addresses within a known range (such as "192.168.*.*" wherein the "*" indicates a wildcard value encompassing all values occupying the position in the address, in this case all numeric values from 0 to 255). A network entity may very well specify rules on the basis of ranges of IP addresses, e.g., an access control list may permit access to a resource only for packets originating from an IP address in the range "192.168.0.0" through "192.168.2.255". This range extends over 768 separate IP addresses (256 for 192.168.0.*, 256 for 192.168.1.*, and 256 for 192.168.2.*). Note that the IP address field may also have individual sporadic values specified by network entities: for example, an ACL may permit access to all IP addresses in the range "192.168.0.0" through "192.168.2.255", and also to the specific IP address 213.34.101.14 (which may correspond to a device having specific privileges). However, because the IP address field has at least some continuous ranges of values, it may be categorized as a field having continuous values, whereas the MAC address field which has only sporadic values would be categorized as not having continuous values.

Because the rules specified by the ACL described above turn on essentially one bit of information in the first case (i.e., either the IP address is within the range or it is not), or two bits of information in the second (i.e., whether the IP address is in the first range, and whether the IP is equal to the specific value), there may be significant advantages to a BDD network model checking technique that can reduce fields having continuous values to a representation of the relevant ranges, either on their own or in addition to specific values. The examples described below disclose techniques for generating such a representation.

To generate representations of the values for each field in a network, first each field and each set of values of the field are identified as described above at steps 402 through 406 of method 400. Each field is then categorized as a field having continuous values (sometimes called as "continuous field" herein) or a field not having continuous values (sometimes called a "sporadic field" herein). It will be appreciated that, as described above, a continuous field may also include one or more sporadic values in addition to one or more continuous ranges of values.

For each sporadic field, all values for the field specified by network entities are accumulated. The values are then encoded logarithmically. The lower limit for the number of required Boolean variables for the field is:

$$\lceil l = \text{Log}_2(r) \rceil \qquad (4)$$

Wherein l is the lower limit for the number of Boolean variables (i.e. bits) required to represent the field, and r is the number of possible values of the field.

In addition to universal MAC addresses, another example of a field likely to be categorized as sporadic is a protocol field. Usually, 8 bits are allocated to denote a protocol field value. However, in practice just a few of these 8 bits are needed in a typical network configuration. It will be appreciated that bit encoding of fields having sporadic values can be accomplished in any of a number of ways according to known techniques.

Fields having continuous ranges of values may include examples such as port numbers, IP addresses, or IP address prefixes. Once a field has been categorized as having continuous ranges of values, and the values and ranges of values have been accumulated for all network entities on the network, the system 220 may identify basic intervals that can be used to define the set of accumulated continuous ranges. The set of basic intervals for a field are defined as a set of intervals or ranges of the value of the field that do not have overlap, and that can be used to construct all of the original continuous ranges specified by various network entities as the unions of basic intervals.

Once a set of basic intervals has been identified for the field, a binary code is assigned to each basic interval. In some embodiments, a Gray code may be used to define the binary code for the basic intervals of a field.

Each continuous range of the field may then be represented by a union (i.e. a binary "OR" operation) of the binary representation of each basic interval defining the continuous range by their union. Each basic interval can be treated essentially as a discrete or sporadic value for the purpose of calculating field entropy.

An example of generating a binary representation for fields having continuous ranges of values will now be described with reference to FIGS. 6-11. A method 1200 for performing these steps will then be described with reference to the flowchart of FIG. 12. These examples will make reference to a continuous field F1 and a sporadic field F2, which may be considered to be the field F1 360 and the field F2 370 from FIG. 3, but need not be for the purpose of this illustrative example.

Figure 6:
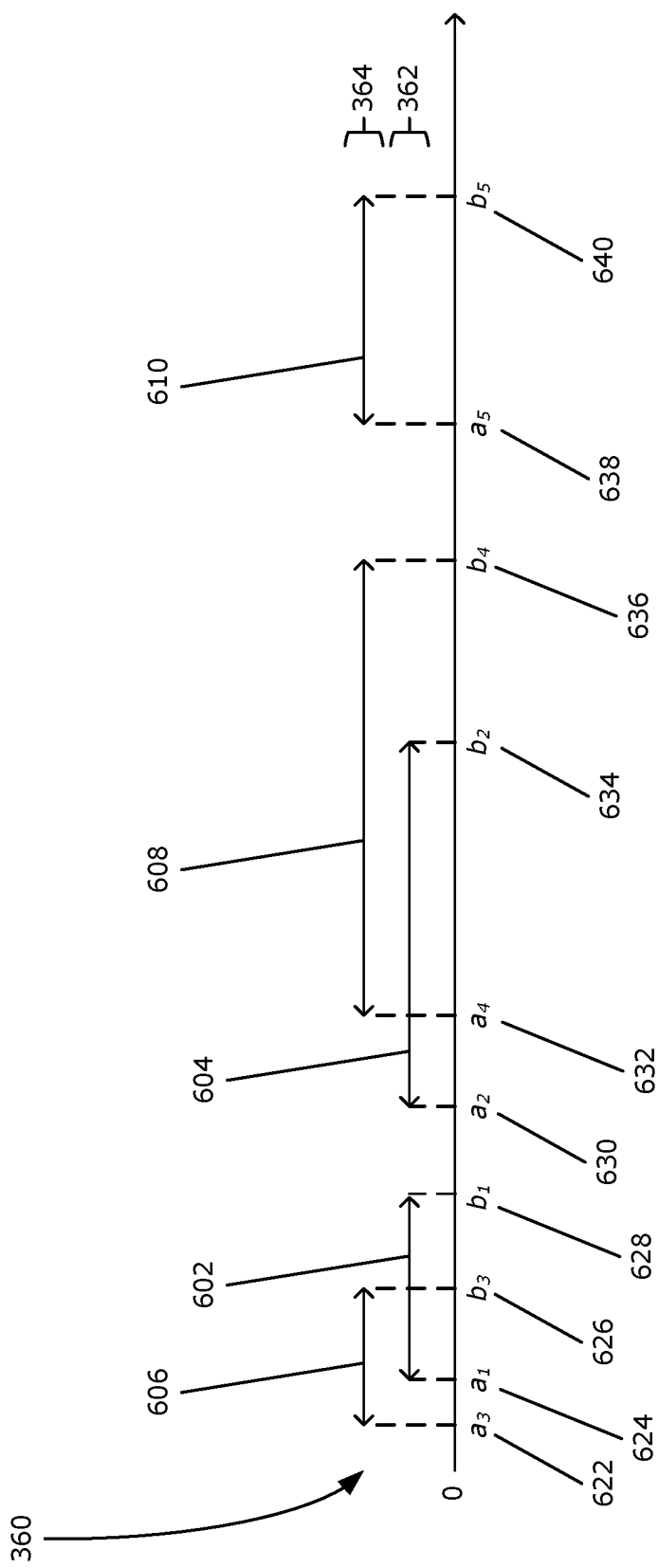
FIG. 6 is a linear chart showing continuous ranges for the value of a field, in accordance with examples described herein.

FIG. 6 is a linear chart showing continuous ranges for the value of field F1 360. In this example, field F1 360 is being represented by the system 220 for inclusion in a BDD model of the network 300. The various network entities 350, 390, 395 have been analyzed by the system 220 as part of its scan of the devices 320, 330, 340 of the network 300. Only network entity 1 350 and network entity 3 395 specify sets of values for field F1 360: specifically, network entity 1 350 specifies first set of values 362, and network entity 3 395 specifies second set of values 364. As shown in FIG. 6, values 362 specify two continuous ranges for the values of F1 360: a first continuous range 602 from boundary value $a_1$ 624 to boundary value $b_1$ 628, and a second continuous range 604 from boundary value $a_2$ 630 to boundary value $b_2$ 634. Values 364 specify three continuous ranges for the values of F1 360: a third continuous range 606 from boundary value $a_3$ 622 to boundary value $b_3$ 626, a fourth continuous range 608 from boundary value $a_4$ 632 to boundary value $b_4$ 636, and a fifth continuous range 610 from boundary value $a_5$ 638 to boundary value $b_5$ 640.

The values of field F1 360 are shown in FIG. 6 increasing along a horizontal axis starting at a zero value on the left side.

Figure 7:
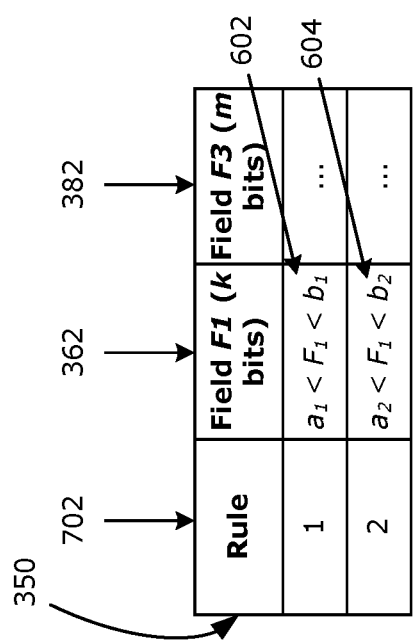
FIG. 7 is a table illustrating a first example access control list, in accordance with examples described herein.

FIG. 7 is a table illustrating a first example access control list (ACL), which is network entity 1 350 in this example. The first set of values 362 for field F1 360 are represented by the continuous ranges specified by a "Field F1" column of the ACL 350. Each range is specified by a separate rule listed in a Rule column 702. Thus, a first rule specifies the first continuous range 602 of FIG. 6, and a second rule specifies the second continuous range 604 of FIG. 6. Each rule may also specify additional values or ranges of values for other fields required to satisfy the rule, such as values for field F3 382 listed in a "Field F3" column. This ACL 350 may be read by the model checking module 240 of the system 220 to accumulate the first set of values 362 for field F1.

Figure 8:
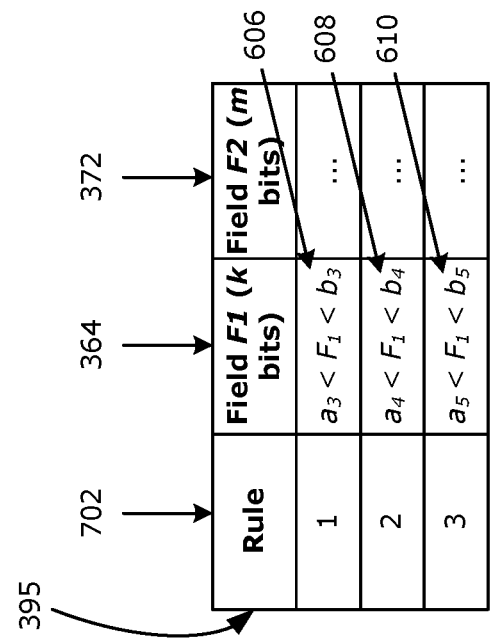
FIG. 8 is a table illustrating a second example access control list, in accordance with examples described herein.

FIG. 8 is a table illustrating a second example access control list (ACL), which is network entity 3 395 in this example. The second set of values 364 for field F1 360 are represented by the continuous ranges specified by a "Field F1" column of the ACL 395. Each range is specified by a separate rule listed in a Rule column 702. Thus, a first rule specifies the third continuous range 606 of FIG. 6, a second rule specifies the fourth continuous range 608 of FIG. 6, and a third rule specifies the fifth continuous range 610 of FIG. 6. Each rule may also specify additional values or ranges of values for other fields required to satisfy the rule, such as values for field F2 372 listed in a "Field F2" column. This ACL 395 may be read by the model checking module 240 of the system 220 to accumulate the second set of values 364 for field F1.

Once the continuous ranges of values specified for a field have been identified, the model checking module 240 of the system 220 then identifies the boundaries of each continuous range.

Figure 9:
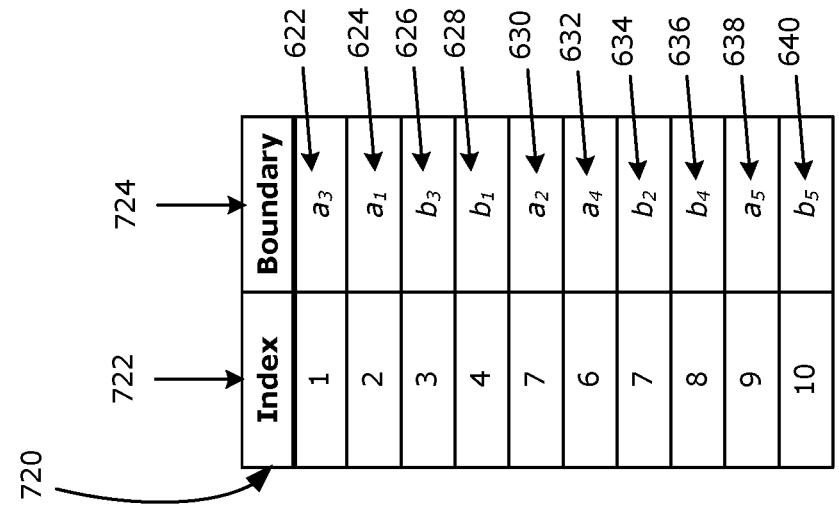
FIG. 9 is a table of continuous range boundaries generated based on the first and second example access control lists of FIG. 7 and FIG. 8 respectively.

FIG. 9 is a table of continuous range boundaries generated based on the first and second example access control lists of FIG. 7 and FIG. 8 respectively. Boundary table 720 includes an index column 722 identifying each boundary value uniquely. Each boundary value 622 through 640 of the continuous ranges of FIG. 6 is listed in a Boundary column 724 corresponding to a unique Index value. The boundary values 724 are listed in order of value, i.e. from the left end of the horizontal axis of FIG. 6 to the right end.

Basic Intervals

Figure 10:
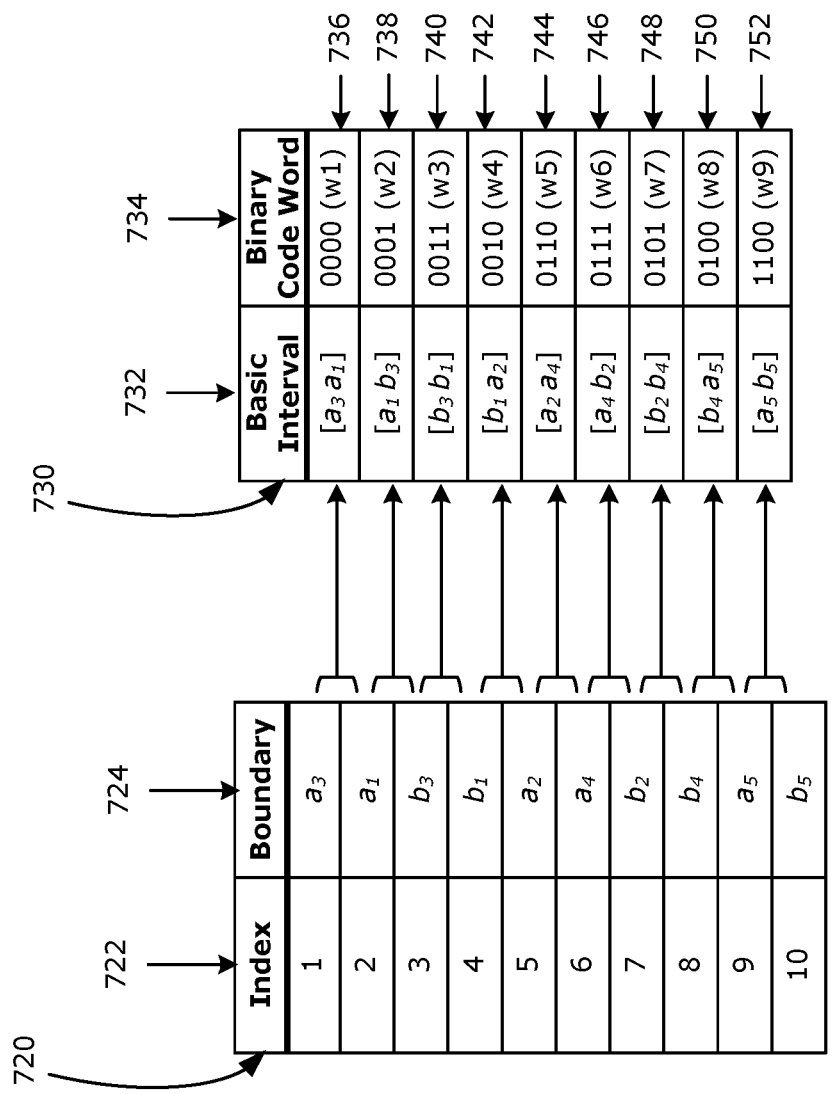
FIG. 10 is the table of continuous range boundaries of FIG. 9 and a table of basic intervals and corresponding binary code words generated based on the table of continuous range boundaries.

Once all boundary values have been identified for all continuous ranges of the value of F1 360 specified in the network 300, as shown in the boundary table 720 of FIG. 9, each two adjacent boundary values in the boundary table 720 are used to construct or define a basic interval, as shown in FIG. 10.

FIG. 10 is the boundary table 720 of FIG. 9 and a table 730 of basic intervals and corresponding binary code words generated based on the boundary table 720. The basic interval table 730 includes a "Basic Interval" column of basic intervals 732, each of which is defined as the interval or range between two adjacent or consecutive boundary values 724 from the boundary table 720. Thus, the first basic interval for field F1 in the present example is the interval between boundary value $a_3$ 622 and boundary value $a_1$ 624, denoted as $[a_3\ a_1]$. Each subsequent basic interval is similarly constructed and denoted, in ascending value.

Corresponding to each basic interval 732 in the basic interval table 730 is a binary code word 734 listed in a "Binary Code Word" column. The bit length of the code word is determined based on the number of basic intervals identified for the field. In this example, there are 9 basic intervals, thereby requiring 4 bits to uniquely represent each basic interval. In this example, a Gray code is used to represent the binary code words 734 for each basic interval, wherein each code word differs from the previous code word by only a single bit value. The use of Gray codes for the binary code words 734 of basic intervals 732 may present certain advantages as described below.

The binary code words 734 listed in the basic interval table 730 are w1 736, w2 738, w3 740, w4 742, w5 744, w6 746, w7 748, w8 750, and w9 752, each being a binary representation encoding a basic interval of field F1 360.

Binary Representation of Continuous Ranges

Once binary representations have been generated for each basic interval, the original continuous ranges specified by various network entities (e.g., 350 and 395) can be re-constructed using unions of the constituent basic intervals 732, and binary representations of each continuous range (e.g., 602 through 610) can be generated as a union of the binary code words 734 of each constituent basic interval 732. As described above, different types of binary encoding can be used to identify the basic intervals. However, if a Gray code is used to encode the binary code words 734 for the set of basic intervals, as in FIG. 10, then according to the property of Gray code wherein two adjacent codes only differ in a single bit, the union of two adjacent basic interval codes results in reducing one bit in the binary representation of the continuous range. For example, to represent continuous range 602, which is the union of basic intervals corresponding to w2 738 (binary code word 0001) and w3 740 (binary code word 0011), a binary representation of continuous range 602 could be constructed such that the value of the most significant bit (denoted a3) is 0, the value of the second most significant bit (a2) is 0, the value of the second least significant bit (a1) is not specified (shown as bit value "x"), and the value of the least significant bit (a0) is 1, i.e. "00x1". Variable a1 can be removed from the Boolean function.

Figure 11:
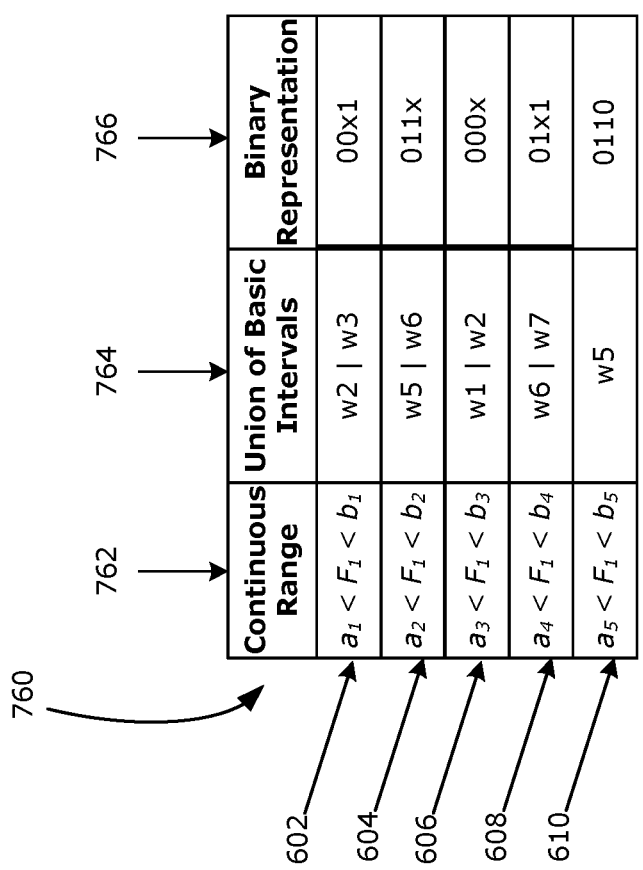
FIG. 11 is a table of the continuous ranges from the first and second examples access control lists of FIG. 7 and FIG. 8 respectively, showing each continuous range represented by a union of basic intervals and a corresponding binary representation based on the table of FIG. 10.

FIG. 11 is a table 760 of the continuous ranges from the first and second examples access control lists 350 and 395 of FIG. 7 and FIG. 8 respectively, showing each continuous range represented by a union of basic intervals 764, as well as a corresponding binary representation 766 of each continuous range. The continuous range table 760 shows each continuous range 762 specified by the network entities: continuous ranges 602 and 604 specified by network entity 1 350, and continuous ranges 606, 608 and 610 specified by network entity 3 395. Each continuous range 762 is mapped to a union of one or more basic intervals 764: for example, first continuous range 602 can be represented as the union of the second and third basic intervals, and the binary representation 766 of the first continuous range 602 is the union (binary "OR") of the code words 734 for those basic intervals, namely w2 738 and w3 740.

Thus, before encoding the network fields into the BDD 500, a preliminary mapping stage may be used to convert the continuous fields of the network into binary representations that reduce the number of bites required to represent the behavior of the network with respect to each such field. Each continuous range of values of a continuous field is first mapped to a union of binary code words for basic intervals, and then the newly generated binary representation of the continuous range is encoded into the BDD space as described above with reference to method 400. It will be appreciated that BDD variables corresponding to continuous fields as configured by method 400 may be defined based on the binary encodings of the continuous ranges, and not based on the original bits used to represent the field.

Figure 12:
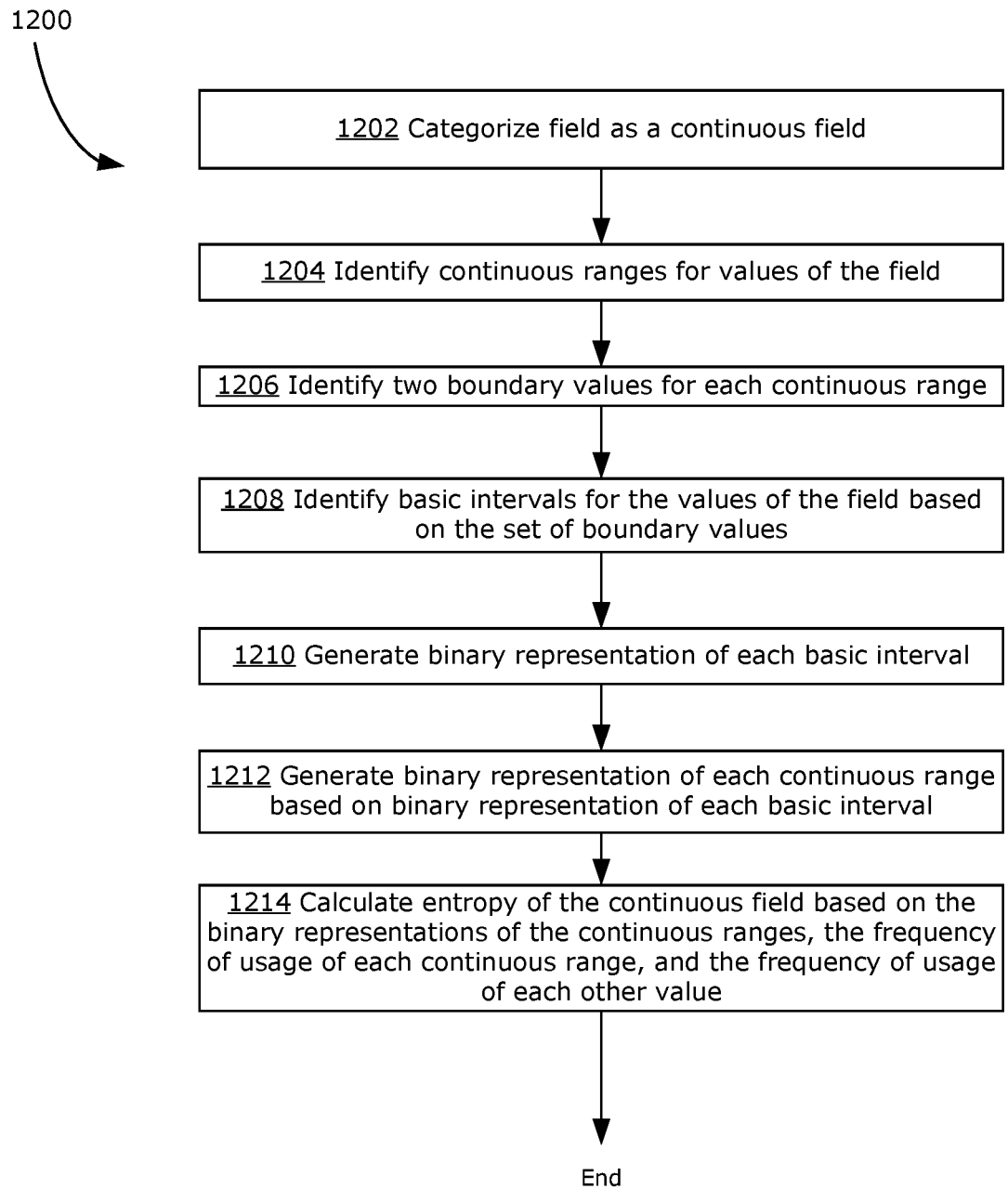
FIG. 12 is a flowchart illustrating the steps of an example method for identifying a plurality of values and calculating an entropy value for a continuous field, in accordance with examples described herein.

FIG. 12 is a flowchart illustrating the steps of an example method 1200 for identifying a plurality of values and calculating an entropy value for a continuous field, combining the continuous range encoding stage described above with reference to FIG. 6-11 and a modified entropy calculation based on method 400 of FIG. 4. This method 1200 may be performed one or more times as part of method 400, for example following step 404, to identify the values of one or more continuous fields and to calculate those continuous fields' entropy values.

At 1202, a field of the plurality of fields identified at step 404 is categorized as a continuous field characterized by values spanning at least one continuous range.

At 1204, one or more continuous ranges for the values of the field are identified.

At 1206, two boundary values are identified for each continuous range. The boundary values for each continuous range of the continuous field collectively define a set of boundary values of the continuous field.

At 1208, a plurality of basic intervals is identified. Each continuous range can be defined as a union of one or more basic intervals. Each basic interval is defined by two boundary values selected from the set of boundary values.

At 1210, a binary representation of each basic interval is generated.

At 1212, a binary representation of each continuous range is generated based on the binary representations of the one or more basic intervals defining the continuous range. The binary representations of the one or more continuous ranges of a continuous field comprise a Gray code.

At 1214, the entropy of the field is calculated based on the binary representations of the continuous ranges for the values of the field, a frequency of usage of each of the continuous ranges of the field's value, and a frequency of usage of each other value of the field. The frequency of usage of a value of a field is based on how many network entities of the computer network model specify the value for the field. The frequency of usage of a continuous range of values of a field is based on how many network entities of the computer network model specify the continuous range of values for the field.

By performing a preliminary encoding of continuous fields as described above, the amount of memory required to build and to store the network BDD model may be reduced. This reduction may be achieved by reducing the number of BDD variables in the BDD space required for constructing network models. Therefore, when the lower number of BDD variables are used for modeling, the size of the sub-trees in the internal data structure (e.g. a table in the memory 228 storing a representation of the BDD 500) may be exponentially reduced due to both shortening of the height of the sub-trees and reducing the number of nodes corresponding to each variable, and as a result the memory requirement may be decreased significantly.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for generating a binary decision diagram (BDD) for checking a computer network model, the method comprising:
   identifying one or more network entities of the computer network model;
   identifying a plurality of fields of the computer network model;
   for each field, identifying a plurality of values for the field as the union of the values for the field specified by each network entity;

calculating an entropy value for each field based on the plurality of values for the field; and ordering a plurality of variables of the BDD based on the entropy values of the fields corresponding to the variables.

2. The method of claim 1, wherein ordering the plurality of variables comprises:

populating a top sub-tree of a BDD tree with a first plurality of variables corresponding to a first field having a highest entropy value of the fields of the computer network model; and populating one or more subsequent BDD sub-trees below the top sub-tree by recursively repeating a step of populating a top sub-tree of each subsequent BDD sub-tree with a subsequent plurality of variables corresponding to a subsequent field having a highest entropy value of the fields of the subsequent BDD sub-tree.

3. The method of claim 2, further comprising:

categorizing at least one field of the plurality of fields as a continuous field characterized by values spanning at least one continuous range; and for each field categorized as a continuous field:
identifying one or more continuous ranges for the values of the field;
generating a binary representation of each continuous range; and
calculating the entropy of the field based on the binary representations of the continuous ranges for the values of the field.

4. The method of claim 3, wherein the entropy value of a field categorized as a continuous field is based on:

each of the binary representations of the continuous ranges of the field's value;

a frequency of usage of each of the continuous ranges of the field's value; and a frequency of usage of each other value of the field.

5. The method of claim 4, wherein the entropy value of a field not categorized as a continuous field is based on a frequency of usage of each value of the field.

6. The method of claim 5, wherein:

the frequency of usage of a value of a field is based on how many network entities of the computer network model specify the value for the field; and the frequency of usage of a continuous range of values of a field is based on how many network entities of the computer network model specify the continuous range of values for the field.

7. The method of claim 3, wherein identifying one or more continuous ranges for the values of a continuous field and generating a binary representation of each continuous range comprises:

identifying one or more continuous ranges for the values of the continuous field, each continuous range being defined by two boundary values such that the boundary values for each continuous range of the continuous field collectively define a set of boundary values of the continuous field;

identifying a plurality of basic intervals such that:
each continuous range can be defined as a union of one or more basic intervals; and
each basic interval is defined by two boundary values selected from the set of boundary values;

generating a binary representation of each basic interval; and generating a binary representation of each continuous range based on the binary representations of the one or more basic intervals defining the continuous range.

8. The method of claim 7, wherein the binary representations of the plurality of basic intervals of a continuous field comprise a Gray code.

9. The method of claim 8, wherein:

the entropy value calculated for each field is a Shannon entropy value;

the entropy value of a field categorized as a continuous field is based on:

each of the binary representations of the continuous ranges of the field's value;

a frequency of usage of each of the continuous ranges of the field's value; and a frequency of usage of each other value of the field;

the entropy value of a field not categorized as a continuous field is based on a frequency of usage of each value of the field;

the frequency of usage of a value of a field is based on how many network entities of the computer network model specify the value for the field; and the frequency of usage of a continuous range of values of a field is based on how many network entities of the computer network model specify the continuous range of values for the field.

10. A system comprising:

one or more processor devices; and a memory storing instructions which, when executed by the one or more processor devices, cause the system to generate a binary decision diagram (BDD) for checking a computer network model by:

identifying one or more network entities of a computer network model;

identifying a plurality of fields of the computer network model;

for each field, identifying a plurality of values for the field as the union of the values for the field specified by each network entity;

calculating an entropy value for each field based on the plurality of values for the field; and ordering a plurality of variables of the BDD based on the entropy values of the fields corresponding to the variables.

11. The system of claim 10, wherein ordering the plurality of variables comprises:

populating a top sub-tree of a BDD tree with a first plurality of variables corresponding to a first field having a highest entropy value of the fields of the computer network model; and populating one or more subsequent BDD sub-trees below the top sub-tree by recursively repeating a step of populating a top sub-tree of each subsequent BDD sub-tree with a subsequent plurality of variables corresponding to a subsequent field having a highest entropy value of the fields of the subsequent BDD sub-tree.

12. The system of claim 11, wherein the instructions, when executed by the one or more processor devices, further cause the system to:

categorize at least one field of the plurality of fields as a continuous field characterized by values spanning at least one continuous range; and for each field categorized as a continuous field:
identify one or more continuous ranges for the values of the field;

generate a binary representation of each continuous range; and calculate the entropy of the field based on the binary representations of the continuous ranges for the values of the field.

13. The system of claim 12, wherein the entropy value of a field categorized as a continuous field is based on:
   each of the binary representations of the continuous ranges of the field's value;
   a frequency of usage of each of the continuous ranges of the field's value; and
   a frequency of usage of each other value of the field.

14. The system of claim 13, wherein the entropy value of a field not categorized as a continuous field is based on a frequency of usage of each value of the field.

15. The system of claim 14, wherein:
   the frequency of usage of a value of a field is based on how many network entities of the computer network model specify the value for the field; and
   the frequency of usage of a continuous range of values of a field is based on how many network entities of the computer network model specify the continuous range of values for the field.

16. The system of claim 12, wherein identifying one or more continuous ranges for the values of a continuous field and generating a binary representation of each continuous range comprises:
   identifying one or more continuous ranges for the values of the continuous field, each continuous range being defined by two boundary values such that the boundary values for each continuous range of the continuous field collectively define a set of boundary values of the continuous field;
   identifying a plurality of basic intervals such that:
      each continuous range can be defined as a union of one or more basic intervals; and
      each basic interval is defined by two boundary values selected from the set of boundary values;
   generating a binary representation of each basic interval; and
   generating a binary representation of each continuous range based on the binary representations of the one or more basic intervals defining the continuous range.

17. The system of claim 16, wherein the binary representations of the plurality of basic intervals of a continuous field comprise a Gray code.

18. The system of claim 17, wherein:
   the entropy value calculated for each field is a Shannon entropy value;
   the entropy value of a field categorized as a continuous field is based on:
      each of the binary representations of the continuous ranges of the field's value;
      a frequency of usage of each of the continuous ranges of the field's value; and
      a frequency of usage of each other value of the field;
   the entropy value of a field not categorized as a continuous field is based on a frequency of usage of each value of the field;
   the frequency of usage of a value of a field is based on how many network entities of the computer network model specify the value for the field; and
   the frequency of usage of a continuous range of values of a field is based on how many network entities of the computer network model specify the continuous range of values for the field.

19. A non-transitory computer-readable medium having instructions tangibly stored thereon, wherein the instructions, when executed by a processor device, cause the processor device to perform the method of claim 1.

20. A non-transitory computer-readable medium having instructions tangibly stored thereon, wherein the instructions, when executed by a processor device, cause the processor device to perform the method of claim 9.

\* \* \* \* \*